United States Patent
Elsaesser et al.

(10) Patent No.: US 9,666,913 B2
(45) Date of Patent: May 30, 2017

(54) HEAT TRANSFER DEVICE

(71) Applicants: Mahle International GmbH, Stuttgart (DE); Behr GmbH & Co. KG, Stuttgart (DE)

(72) Inventors: Alfred Elsaesser, Keltern (DE); Achim Gommel, Simmzoheim (DE); Martin Helmis, Esslingen (DE); Michael Krappel, Stuttgart (DE); Bernd Schaefer, Stuttgart (DE); Markus Wesner, Stuttgart (DE)

(73) Assignees: Mahle International GmbH (DE); Behr GmbH & Co. KG (DE)

( * ) Notice: Subject to any disclaimer, the term of this patent is extended or adjusted under 35 U.S.C. 154(b) by 512 days.

(21) Appl. No.: 14/162,734

(22) Filed: Jan. 23, 2014

(65) Prior Publication Data
US 2014/0205881 A1    Jul. 24, 2014

(30) Foreign Application Priority Data
Jan. 24, 2013  (DE) ........................ 10 2013 201 109

(51) Int. Cl.
| H01M 10/613 | (2014.01) |
| H01M 10/625 | (2014.01) |
| H01M 10/6568 | (2014.01) |
| H01M 10/663 | (2014.01) |
| F01P 7/16 | (2006.01) |

(52) U.S. Cl.
CPC ..... H01M 10/5004 (2013.01); H01M 10/613 (2015.04); H01M 10/625 (2015.04); H01M 10/6568 (2015.04); H01M 10/663 (2015.04)

(58) Field of Classification Search
CPC ............. H01M 10/613; H01M 10/663; H01M 10/6568; H01M 10/625; F01P 7/165
USPC ........................................................ 429/120
See application file for complete search history.

(56) References Cited

U.S. PATENT DOCUMENTS

| 4,351,391 A * | 9/1982 | Eberhardt ............... F28D 7/106 165/154 |
| 5,806,479 A | 9/1998 | Bauer et al. |
| 6,705,101 B2 | 3/2004 | Brotz et al. |
| 7,293,535 B2 | 11/2007 | Dobler et al. |
| 2003/0067747 A1* | 4/2003 | Hasegawa .......... H05K 7/20909 165/47 |
| 2005/0088820 A1* | 4/2005 | Naganawa .......... F28D 1/05341 361/697 |
| 2005/0170241 A1 | 8/2005 | German et al. |
| 2010/0025125 A1* | 2/2010 | Bienert ............. B60H 1/00278 180/65.1 |
| 2011/0255960 A1* | 10/2011 | Seitz ..................... F04D 29/588 415/203 |

(Continued)

FOREIGN PATENT DOCUMENTS

| DE | 10128164 A1 | 12/2002 |
| DE | 10231834 A1 | 2/2004 |
| DE | 102011008653 A1 | 7/2012 |

(Continued)

*Primary Examiner* — Sean P Cullen
(74) *Attorney, Agent, or Firm* — Fishman Stewart PLLC

(57) ABSTRACT

A heat transfer device for a motor vehicle may include a pump and a heat exchanger. The heat exchanger may have a first inlet and a first outlet for a refrigerant, and a second inlet and a second outlet for a coolant. The pump and the heat exchanger may be mounted to each other forming a common assembly.

17 Claims, 2 Drawing Sheets

(56) References Cited

U.S. PATENT DOCUMENTS

2012/0152498 A1\* 6/2012 Lyon ..................... F28D 15/00
                                                    165/104.31
2014/0013787 A1   1/2014 Wesner et al.

FOREIGN PATENT DOCUMENTS

| KR | 10-2008-0078543 | 8/2008 | | |
|----|-----------------|--------|---|---|
| KR | 10-2011-0081613 | 7/2011 | | |
| WO | WO 2012095531 A1 \* | 7/2012 | ............... | B60H 1/00 |

\* cited by examiner

HEAT TRANSFER DEVICE

CROSS-REFERENCE TO RELATED APPLICATIONS

This application claims priority to German Patent Application No. 10 2013 201 109.1, filed Jan. 24, 2013, the contents of which are hereby incorporated in their entirety.

TECHNICAL FIELD

The present invention relates to a heat transfer device comprising a pump and a heat exchanger according to the preamble of the claim 1. The invention further relates to a hybrid vehicle or electric vehicle comprising such a heat transfer device.

BACKGROUND

Known from DE 101 28 164 A1 is a generic heat transfer device in the form of a vehicle cooling system for a temperature-increasing device, in particular a vehicle battery or a fuel cell, comprising a coolant that cools said device by including an air conditioning system that serves for air conditioning the passenger cabin of the vehicle. It is provided here that the coolant is a cooling liquid that is circulated in a cooling circuit and is thermally integrated in the refrigeration circuit of the air conditioning system so as to be cooled. Through this, a vehicle cooling system is to be created that allows dissipating significantly higher amounts of heat.

Known from DE 10 2011 008 653 A1 is a heat exchanger or chiller having a disk design, comprising a multiplicity of stacking disks stacked on top of each other so that therebetween a first fluid channel is formed for a first fluid, and a second fluid channel is formed for a second fluid. The stacking disks have first through-openings as a first fluid channel for feeding and discharging the first fluid, and second through-openings for feeding and discharging the second fluid. The heat exchanger also comprises a deflection device that closes at least a first through-opening so that the first fluid is guided in a meander-like manner through the at least two sections of the first fluid channel between the stacking disks and thereby in opposite direction through the heat exchanger. In order to be able to design the heat exchanger as cost-effectively as possible and, at the same time, with optimized installation space, a first inlet or outlet opening is formed by an immersion pipe, wherein the first fluid can be fed through the immersion pipe into the fluid channel so that the first inlet and outlet openings can be arranged on the same side of the heat exchanger.

In particular in modern hybrid vehicles or electric vehicles there is an increased demand for cooling, for example also for cooling the vehicle batteries, while the available installation space for corresponding cooling devices decreases at the same time.

SUMMARY

The present invention therefore is concerned with the problem of providing an improved or at least an alternative embodiment for a heat transfer device of the generic kind which is in particular characterized by a cost-effective production and a compact construction.

This problem is solved according to the invention by the subject matters of the independent claims. Advantageous embodiments are subject matter of the dependent claims.

The present invention is based on the general idea, for a generic heat transfer device comprising a pump and a heat exchanger, to mount these two components to each other and to integrate them into a common assembly. Furthermore, the heat exchanger has a first inlet and a first outlet for a refrigerant, and a second inlet and a second outlet for a coolant. Here, the pump is directly connected with its outlet to the second inlet of the heat exchanger, as a result of which previously required complex hose lines between the heat exchanger and the pump can be eliminated. By integrating the pump and the heat exchanger into a common assembly, the heat transfer device according to the invention is in addition constructed in an extremely compact manner, which is in particular of great advantage in the case of modern hybrid or electric vehicles since they have an increased demand for cooling while, at the same time, the available installation space is not increased. A further great advantage of the heat transfer device according to the invention is that a vehicle manufacturer can obtain the entire system from a single source, and can introduce it in a preassembled state into his production line. By eliminating the previously required additional hose lines between the pump and the heat exchanger, it is in addition possible to produce the heat transfer device in a more cost-effective manner. Likewise, it is possible to utilize synergy effects so that, for example, the refrigerant can be used for additionally cooling the pump or an electronic system of the pump.

Advantageously, a connection flange is provided on which at least the first inlet and outlet and also an expansion valve are arranged. Such an expansion valve thus can also form an integral part of the assembly consisting of the pump and the heat exchanger, whereby an even more compact construction can be achieved. The expansion valve itself can be formed as a throttle and can be arranged upstream of the heat exchanger so that a pressure level of the refrigerant upstream of the expansion valve is higher than downstream of the expansion valve.

In a further advantageous embodiment of the solution according to the invention, not only the first inlet and outlet are arranged on the connection flange, but in addition also the second inlet and outlet and the pump. Thus, in such an embodiment, all inlets and outlets are integrated in the connection flange, wherein the connection flange can be made, for example, from aluminum. In order to be able to ensure long-term resistance to the refrigerant, wrought alloys are preferably used for the connection flange since cast alloys often do not have the required resistance. Alternatively, the pump and the connection flange can also be arranged on opposite sides of the heat exchanger, which, depending on the installation space available, is also an interesting alternative. Moreover, a channel structure for guiding the refrigerant and/or the coolant can be provided within the connection flange. In this case, the connection flange also has integrated ducts or lines in which the refrigerant or coolant flows.

In a further advantageous embodiment of the solution according to the invention, at least parts of the pump, in particular the electronics thereof or a stator thereof, are cooled by means of the heat exchanger. By a skillful arrangement or a by skillful connection of the pump, in particular of a water pump, to the heat exchanger, a temperature gradient can be used for cooling the pump, in particular for cooling the electronics thereof or the stator thereof. Through this it is possible to dimension the pump or an electric motor for driving the pump such that they are overall smaller, whereby, in turn, advantages with regard to installation space and weight can be achieved.

Advantageously, the heat exchanger is designed as a stacking disk cooler or as a chiller, that is, as a vaporizer. By designing the heat exchanger as a stacking disk cooler, it is possible, depending on the number of stacking disks, to implement different cooling capacities in a comparatively simple manner. It applies here that with an increasing number of stacking disks, the cooling capacity of the heat exchanger increases as well.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description.

DETAILED DESCRIPTION

Figure 1:
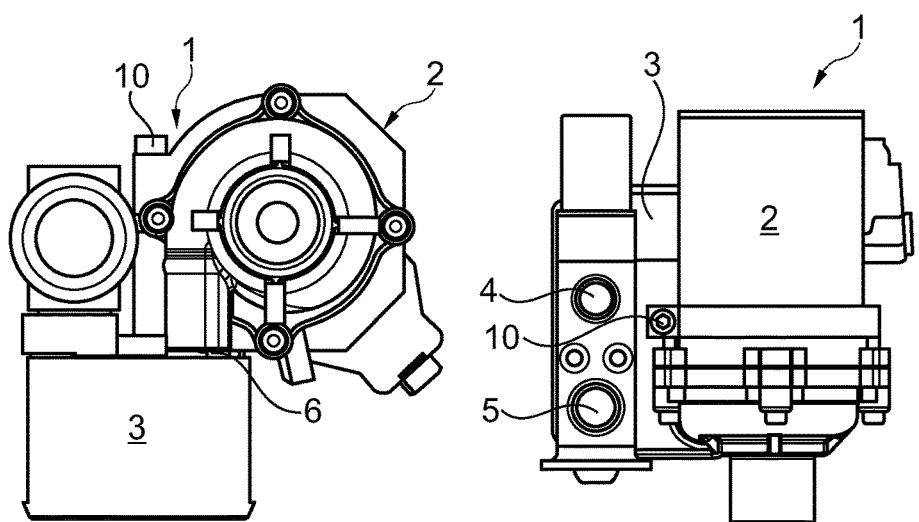
FIG. 1 shows different views onto a heat transfer device according to the invention.
Figure 2:
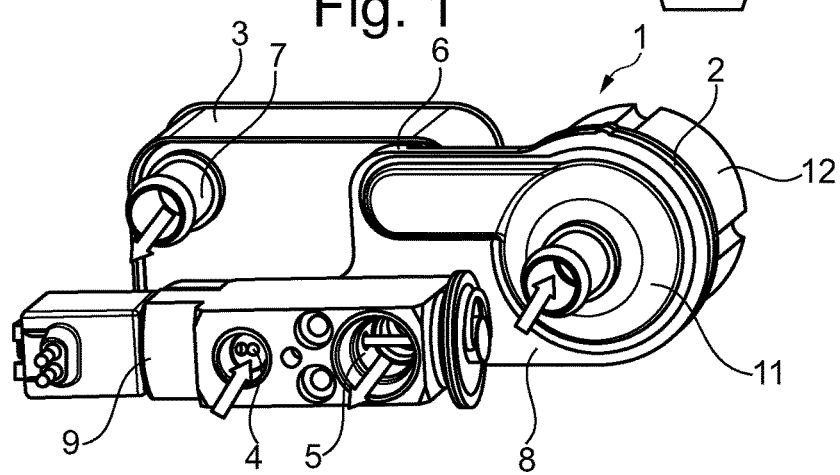
FIG. 2 shows an illustration as in FIG. 1, but with the pump arranged differently.
Figure 3:
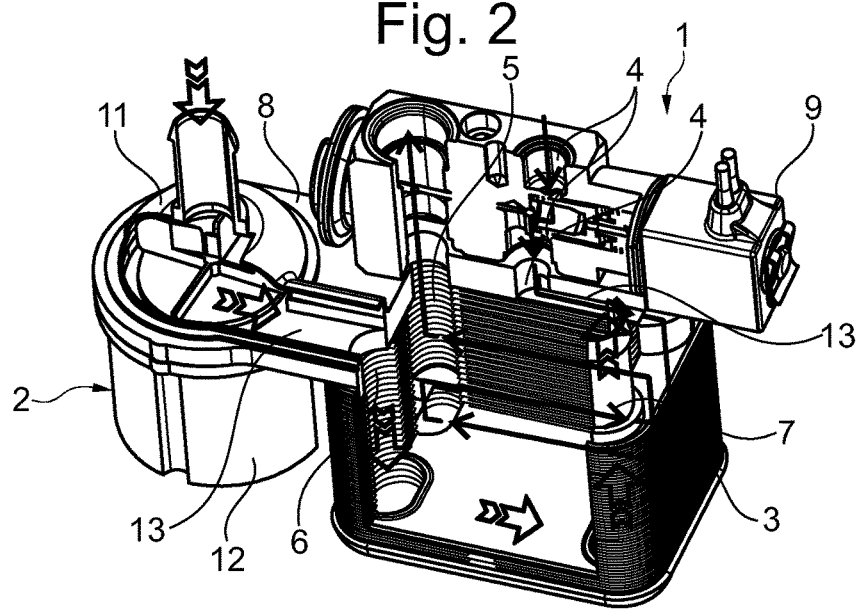
FIG. 3 shows a sectional view through the heat transfer device illustrated according to FIG. 2, FIGS. 4 to 6 show further embodiments of the heat transfer device according to the invention, in each case with a differently arranged pump.
Figure 4:
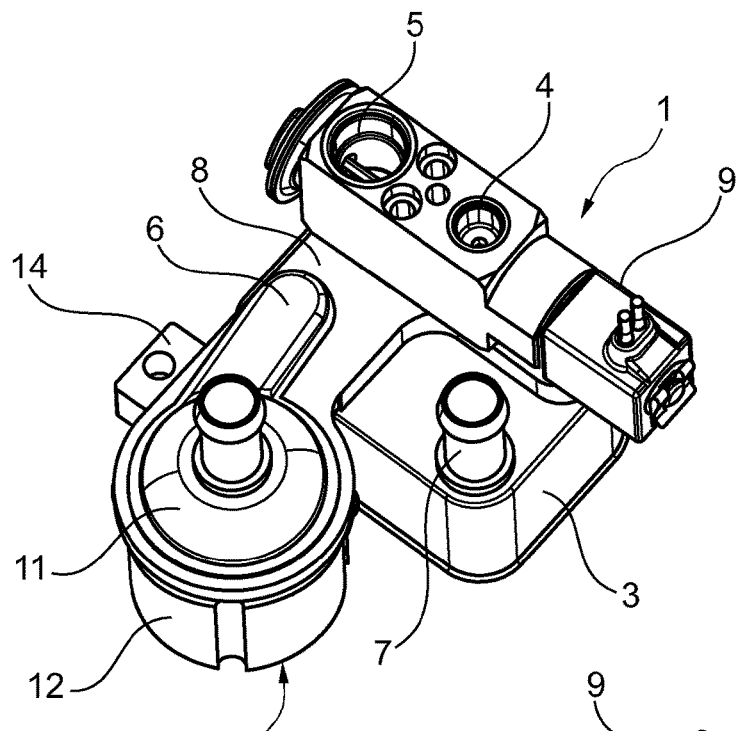

According to the FIGS. 1 to 6, a heat transfer device 1 has a pump and a heat exchanger 3. The heat exchanger 3 can be designed, for example, as a stacking disk cooler or as a chiller, thus, in particular, as a vaporizer. In the case of a design as a stacking disk cooler, a different cooling capacity can be implemented, depending on the number of disks used. Moreover, the heat exchanger 3 has a first inlet 4 and a first outlet 5 for a refrigerant, and a second inlet 6 and a second outlet 7 for a coolant (cf. in particular FIG. 2). In order to be able from now on to achieve a construction as a compact as possible, the pump 2 and the heat exchanger 3 are mounted to each other and form a common assembly which is not only preassembled, but can also be supplied to the vehicle manufacturer in a preassembled state. By integrating both the pump 2 and the heat exchanger 3 into a common heat transfer device 1, in particular the connecting lines, which were previously required between these two components, are eliminated, whereby in addition to an advantageous installation space, cost advantages can also be achieved. Moreover, the installation complexity is reduced since the pump 2 can be connected, in particular screwed, directly or indirectly to the heat exchanger 3 via a connection flange 8 (cf. FIGS. 2 to 4).

In a further advantageous embodiment of the solution according to the invention, a connection flange 8 is provided which generally can be designed as a component which is separate from the heat exchanger 3, and on which at least the first inlet 4 and the first outlet 5 and an expansion valve 9 are arranged. The expansion valve 9 can be designed in a throttle-like manner and thereby controls the refrigerant supply to the heat exchanger 3. Moreover, the second inlet 6 and the second outlet 7 and also the pump 2 can also be arranged on the connection flange 8. The pump 2 and the connection flange 8 can be arranged on opposite sides of the heat exchanger or on the same side of the heat exchanger 3, as illustrated according to the FIGS. 2 to 4. Of course, a direct connection of the pump 2 to the heat exchanger 3 is also conceivable, as illustrated according to the FIGS. 1, 5 and 6, as well as a direct connection of the expansion valve 9 to the heat exchanger 3. Connecting the pump 2 to the heat exchanger 3 can be carried out, for example, by means of a screw connection, in particular even by using a single screw 10 (cf. FIG. 1). Moreover, screwing the pump 2 to the connection flange 8 is also conceivable, in particular if the pump 2 has a cover 11 that can be screwed to a housing 12 of the pump 2 and thereby clamps the connection flange 8 therebetween. Moreover, the connection flange 8 can have a channel structure 13 (cf. FIG. 3) and thereby enables an internal fluid flow. Also, it is conceivable that at least portions of the pump 2, in particular the electronics thereof or a stator thereof are cooled by means of the heat exchanger 3, are cooled in particular by the refrigerant flowing through the heat exchanger 3. The pump 2 is designed for delivering the coolant and, in theory, can also be cooled by said coolant, at least partially. Usually, the pump 2 is arranged upstream of the heat exchanger 3 and therefore feeds the coolant to the heat exchanger. For fastening the heat transfer device 1 to a body or an internal combustion engine of a motor vehicle, which is not illustrated, at least one lug 14 (cf. FIG. 4) can be arranged on the connection flange 8, via which lug the entire heat transfer device 1 can be screwed on.

Figure 5:
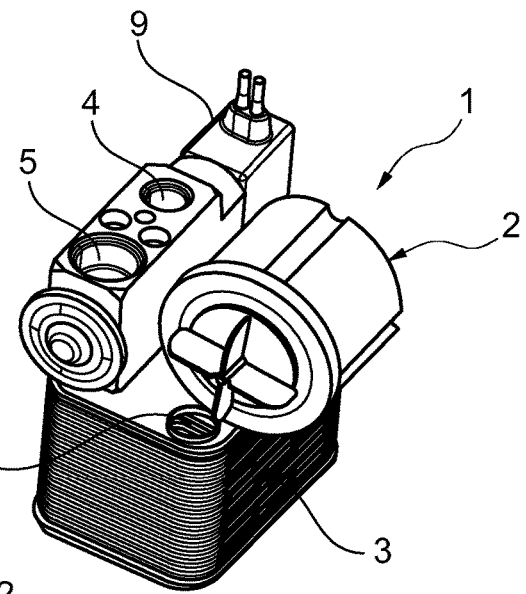
Figure 6:
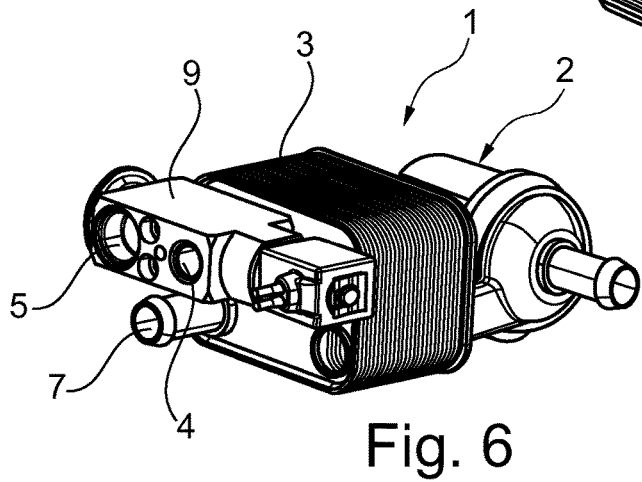

The connection flange 8 is usually used for connecting the expansion valve 9 or the pump 2 to the heat exchanger 3, wherein it is of course also conceivable to fasten the pump 2 and the expansion valve 9 directly to the heat exchanger 3, as shown according to the FIGS. 1, 5 and 6. By arranging the pump 2 directly on the heat exchanger 3, the coolant delivered by the pump 2 is comparatively less deflected, whereby the flow resistance can be reduced. Moreover, by arranging the pump 2 directly on the heat exchanger 3, a particularly compact construction can be achieved. In the heat exchanger 3, two fluid circuits are separated from each other, namely the circuits of the coolant and the refrigerant. The expansion valve 9 controls the flow through the heat exchanger 3 and therefore also the temperature. The refrigerant is usually used for cooling the comparatively warmer coolant. Such a configuration can be found in particular in hybrid vehicles or electric vehicles for cooling batteries.

With the heat transfer device 1 according to the invention, a compact structural unit requiring little installation space can be created, wherein a vehicle manufacturer is provided with the great advantage to obtain the entire system from a single source and to introduce it in a preassembled state into the production line. By eliminating the previously required lines between the pump 2 and the heat exchanger 3, the material and installation costs required for this are also eliminated. In addition, synergy effects can be utilized, in particular the use of the refrigerant for additionally cooling the pump 2 or the electronics thereof.

The invention claimed is:

1. A heat transfer device, comprising:
   a pump and a heat exchanger;
   a connection flange connecting the pump to the heat exchanger;
   wherein the heat exchanger includes a first inlet and a first outlet for a refrigerant, and a second inlet and a second outlet for a coolant;

wherein the pump and the heat exchanger are mounted to each other via the connection flange forming a common assembly;
wherein at least the first inlet and the first outlet of the heat exchanger are disposed on the connection flange; and
wherein the connection flange includes an internal channel structure arranged to fluidly connect the pump to the heat exchanger, the internal channel structure including a wall enclosing a flow path for the coolant extending from a pump outlet to the second inlet of the heat exchanger, and wherein the wall of the internal channel structure enclosing the flow path extends along the connection flange radially with respect to a flow cross-section of the second inlet of the heat exchanger.

2. The heat transfer device according to claim 1, wherein the connection flange is formed from aluminum.

3. The heat transfer device according to claim 1, wherein the pump and the connection flange are arranged on the same side of the heat exchanger.

4. The heat transfer device according to claim 1, wherein at least part of the pump is cooled by at least one of the coolant and the refrigerant.

5. The heat transfer device according to claim 1, wherein the connection flange has at least one lug via which the common assembly can be connected to at least one of a body and an internal combustion engine of a motor vehicle.

6. The heat transfer device according to claim 1, wherein the pump is arranged in the flow path upstream of the heat exchanger.

7. The heat transfer device according to claim 1, wherein the heat exchanger is configured as at least one of a stacking disk cooler and as a chiller.

8. The heat transfer device according to claim 1, wherein the heat exchanger is configured as a vaporizer.

9. The heat transfer device according to claim 1, wherein the pump includes a housing and a cover securable to the housing, and wherein the connection flange is clamped between the housing and the cover for mounting the pump when the cover is secured to the housing.

10. The heat transfer device according to claim 1, wherein at least one of the second inlet and the second outlet of the heat exchanger is disposed on the connection flange.

11. The heat transfer device according to claim 1, further comprising an expansion valve for controlling a supply of the refrigerant to the heat exchanger, wherein the expansion valve is disposed on the connection flange.

12. The heat transfer device according to claim 11, wherein the expansion valve is arranged in fluid communication with the first inlet.

13. A hybrid vehicle or electric vehicle comprising: a heat transfer device for cooling a battery, the heat transfer device including:
a pump and a heat exchanger; and
a connection flange connecting the pump to the heat exchanger;
wherein the heat exchanger includes a first inlet and a first outlet for a refrigerant, and a second inlet and a second outlet for a coolant, and the pump and the heat exchanger are mounted to each other via the connection flange forming a common assembly;
wherein at least the first inlet and the first outlet of the heat exchanger are disposed on the connection flange; and
wherein the connection flange includes an internal channel structure arranged to fluidly connect the pump to the heat exchanger, the internal channel structure including a wall enclosing a flow path for the coolant extending from a pump outlet to the second inlet of the heat exchanger, and wherein the wall of the internal channel structure enclosing the flow path extends along the connection flange radially with respect to a flow cross-section of the second inlet of the heat exchanger.

14. The vehicle according to claim 13, wherein the connection flange has at least one lug via which the common assembly can be connected to at least one of a body and an internal combustion engine of the vehicle.

15. The vehicle according to claim 13, wherein the heat exchanger is configured as at least one of a stacking disk cooler, a chiller, and a vaporizer.

16. The vehicle according to claim 13, wherein the heat transfer device further includes an expansion valve disposed on the connection flange.

17. The vehicle according to claim 16, wherein the expansion valve is arranged in fluid communication with the first inlet for controlling a supply of the refrigerant to the heat exchanger.

* * * * *